(12) United States Patent
Eraker et al.

(10) Patent No.: US 9,436,945 B2
(45) Date of Patent: Sep. 6, 2016

(54) INTERACTIVE MAP-BASED SEARCH AND ADVERTISING

(75) Inventors: David Eraker, Seattle, WA (US);
Marcus Smith, Woodinville, WA (US);
Savan Kong, Seattle, WA (US); Josh Horton, Seattle, WA (US)

(73) Assignee: REDFIN CORPORATION, Seattle, WA (US)

( * ) Notice: Subject to any disclaimer, the term of this patent is extended or adjusted under 35 U.S.C. 154(b) by 570 days.

(21) Appl. No.: 12/759,718

(22) Filed: Apr. 14, 2010

(65) Prior Publication Data

US 2010/0198684 A1 Aug. 5, 2010

Related U.S. Application Data

(63) Continuation of application No. 11/344,962, filed on Feb. 1, 2006, now abandoned.

(60) Provisional application No. 60/649,459, filed on Feb. 1, 2005.

(51) Int. Cl.
*G06Q 30/00* (2012.01)
*G06Q 30/02* (2012.01)
*G06F 17/30* (2006.01)

(52) U.S. Cl.
CPC ......... *G06Q 30/02* (2013.01); *G06F 17/30241* (2013.01); *G06Q 30/0251* (2013.01)

(58) Field of Classification Search
CPC .................................................. G06Q 30/0241
USPC ............................................................ 705/14
See application file for complete search history.

(56) References Cited

U.S. PATENT DOCUMENTS

| | | | |
|---|---|---|---|
| 2002/0077936 A1* | 6/2002 | Wiese | 705/27 |
| 2002/0081020 A1* | 6/2002 | Shimazu | 382/154 |
| 2002/0082942 A1* | 6/2002 | Shimazu | 705/26 |
| 2002/0089534 A1* | 7/2002 | Siekmann | 345/738 |
| 2004/0119737 A1* | 6/2004 | Smolin | G06Q 30/02 715/738 |
| 2005/0027705 A1* | 2/2005 | Sadri et al. | 707/5 |
| 2005/0132305 A1* | 6/2005 | Guichard et al. | 715/855 |
| 2005/0149432 A1* | 7/2005 | Galey | 705/38 |
| 2009/0160873 A1* | 6/2009 | Kew | G06Q 10/00 345/629 |
| 2010/0220174 A1* | 9/2010 | Mendoza et al. | 348/39 |

* cited by examiner

*Primary Examiner* — Matthew L Hamilton
(74) *Attorney, Agent, or Firm* — Foster Pepper PLLC; P. G. Scott Born; Richard T. Black

(57) ABSTRACT

A computer system locates objects and content by navigating an aerial or satellite image map of a geographic region. The system determines a search region corresponding to the geographic region by use of geospatial information associated with the geographic region. Once the search region is determined, the system searches a database for objects and content that are associated with the search region and that satisfy certain predetermined criteria and characteristics. Relevant ads are then shown to the user within an interactive mapping experience.

12 Claims, 12 Drawing Sheets

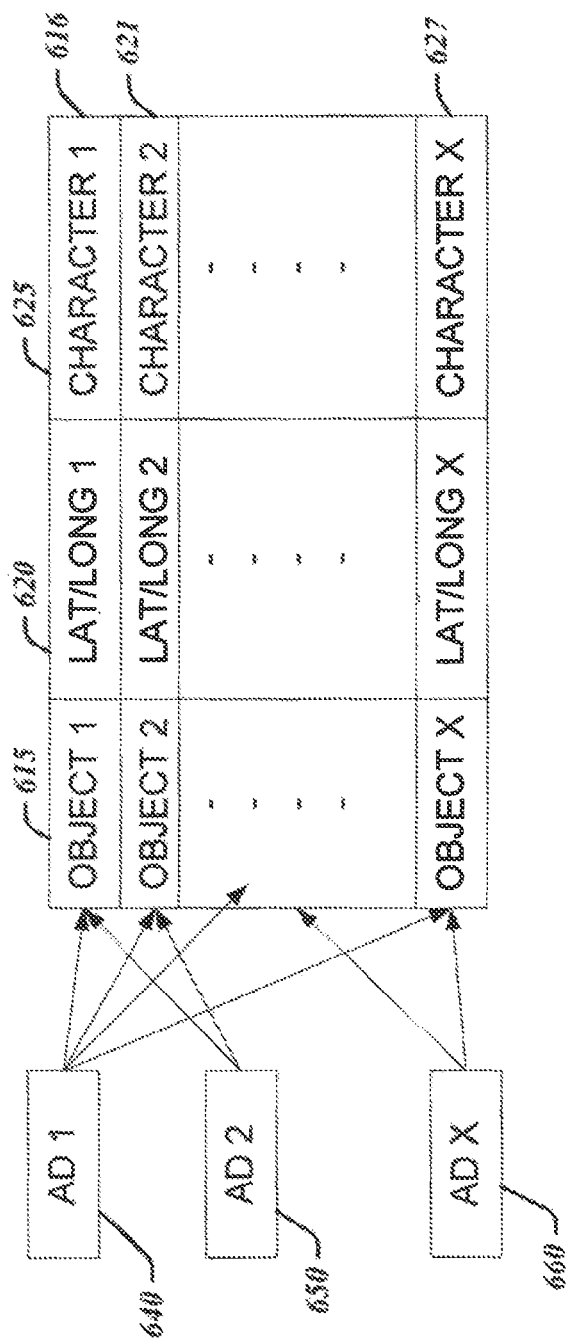
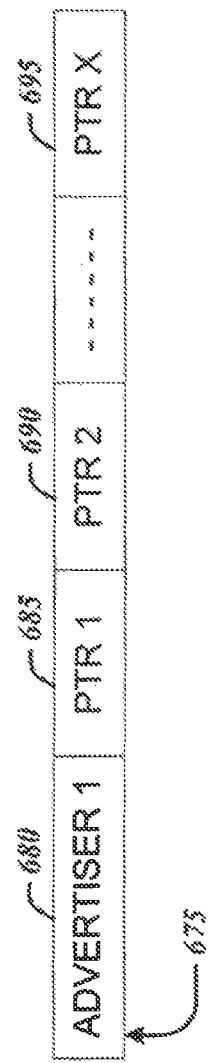

INTERACTIVE MAP-BASED SEARCH AND ADVERTISING

CROSS-REFERENCE TO RELATED APPLICATION

This application claims the benefit of U.S. Provisional Patent Application No. 60/649,459, filed Feb. 1, 2005, and which is incorporated herein by reference.

FIELD OF THE INVENTION

This disclosure relates generally to methods and systems for computerized search of content and objects based on aerial and satellite maps and, more particularly, relates to search using characteristics associated with content, objects, and a location within an interactive map. This disclosure also relates to methods for selling and administering advertisements based upon these characteristics and location.

BACKGROUND

Consumers have long needed an efficient way to discover and evaluate information about content, goods, services, and other objects. The typical person finds information about content and objects by word of mouth, by checking the classified advertisements section of the newspaper, or perhaps by submitting a text query to an interne search engine, such as Google. None of those methods are completely satisfactory solutions to the problem of finding content and objects based upon their characteristics as well as their location. Problems associated with current mapping technology further limit effective search for objects and content. For example, current mapping technology is focused upon displaying a single result such as a restaurant or destination and not on search or discovery. Traditional non-interactive maps are based on the display of a static image for a map. This requires the computer hosting the map to redraw an image that includes both vector and raster data whenever a user pans across or zooms within the map. In this way, non-interactive maps severely limit the speed and quality of the user experience. This problem is further exacerbated if a search is refined based on narrowing the range of characteristics associated with an object or content, causing further performance limitations in the user experience as additional lag is caused by the server refreshing the content again. It is difficult to manipulate objects and content in a non-interactive map without requiring the computer hosting the map to redraw the map image. Targeted advertising with traditional non-interactive maps is limited and cannot display content and advertising related to the user's map usage in real time. For example, seamlessly changing advertisements as the user traverses from one geographic region to another, or zooms from the low level to a high level is not possible with non-interactive maps due to the time required to generate static map images. To maximize the value of additional content and advertising to both map users and advertisers, the content and advertising must be made as relevant as possible to the user. The current non-interactive mapping systems have severe limitations associated with determining and maximizing the relevance of objects and content and advertising that are displayed in the context of user searches, and search result interactions. Moreover, current non-interactive maps do not allow the sale of advertisements associated with objects and content based on interactive mapping movement, a selected bounding region on the map, a group of regions, zoom level or elevation, characteristics of objects and content, or grouped search results. Further, current non-interactive maps do not allow for dynamic pricing models for advertising, the ability to estimate ad costs, or the ability to define an ad location bounding box in three dimensions using X, Y, and Z coordinates. Unique aspects of the U.S. residential real estate market present a set of problems that make search, interactive mapping, and advertising systems particularly useful. There is a need for a system that overcomes limitations of current search, non-interactive mapping, and local advertising as well as providing additional benefits.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the FIGURES, and from the claims (which follow the detailed description). Under an embodiment of the invention, a computer user searches for content and objects by navigating a viewing window above an aerial or satellite image-based map of a geographic region. The viewing window is contained in a web page displayed in a web browser. After the web page displays an aerial map of the desired geographic region, the system determines geospatial information (e.g., latitude, longitude, etc.) corresponding to the geographic region displayed in the viewing window. The system determines, at least in part based on the determined geospatial information, a search region corresponding to the geographic region shown in the viewing window. The system then searches a database for content and objects associated with the determined search region. The system may send the search results to the web page, a user-provided e-mail address facsimile telephone number, or mobile device (by, for example, SMS messaging). Under another embodiment of the invention, a user searches for content or object information by selecting, in a viewing window of a web page on a client computer display, an aerial or satellite image of a geographic region. A server computer receives a search request from application software on the client computer. The search request has geospatial information defining the geographic region displayed in the viewing window. The server computer identifies objects, content, and their characteristics within the geographic region. The server transmits information associated with the objects, content and characteristics to the client computer, which presents the information to the user. The results can be ranked or ordered according to predetermined criteria as well as associated with locations within the map. For objects and content, the predetermined characteristics can be any type of text, image, or other type of content relevant to the geographic region. A server computer delivers an interactive mapping experience which is superior to non-interactive maps by utilizing client-side processing of data, client-side caching, client side pre-fetching, aerial and satellite image pyramids, and vector pyramids. This results in real-time user interactivity and extremely low latency for additional data requests from the server. Users may zoom, pan, and add and remove data layers from the map, such as parcel outlines, roads, or commercial location icons, without requiring a page or map image reload. Further, users may interact with content on and around the map without requiring web page or map image redraws. For example, a user may click on an object that is for sale, view a detailed description, and request the display of additional characteristics associated with the object without having to wait for the object and map image to be redrawn. The server additionally supports interactive time animations involving data layers on the map. For example, a user may request to see a two color map overlay representing the density of various home prices overlaid on the interactive map. The overlay can be manipulated either manually or in the context of an animation on the axis of time to visually depict changes in a regions price, over time. When displaying related objects, content and advertising that are relevant to the user's map usage, the server, can, for example, seamlessly change advertisements as the user traverses from one geographic region to another, or zooms from a low level to the high level. To enhance the user experience and to provide a relevant, highly targeted advertising opportunity, the server provides a means for displaying additional objects, content and advertising in the context of user searches and search result interactions. The additional content and advertising may be unstructured content, such as free-form editorial text or banner advertisements. It may also take the form of structured results from additional searches. For example, when a user searches for properties in a given area, the system can, for example, conduct a secondary search of other objects available for sale in this area, and can then order the secondary search results in such a manner as to add value and relevance to the user. A server computer additionally allows users to buy targeted advertising content based on selected regions of a map represented by latitude and longitude coordinates. Groups of regions can also be purchased. Further, defining one or more elevation value(s), or elevation above a given area defined by latitude and longitude coordinates, allows a three dimensional bounded space above the map surface to be arbitrarily sized. The server can apply additional characteristic filters to the three dimensional bounded space(s) to define more narrowly the extent of a bounded area above a map where objects and content or advertising can be display either prior to or as a result of a user search. Once the bounded space and characteristics are defined, the server provides an estimated price for specific ads shown within the bounded space as a function of one or more aspects of time, volume of ad views, user usage, and user interaction with the ads, relevance to the user, competing bids on the bounded space, or another pricing model. Relevance may be determined by search characteristics, search results, elevation, user interactions, user preferences, conditional probabilities, and related considerations. Advertisers may estimate advertising costs using reports generated by the server that indicate the expected volume and cost associated with a specific targeted advertising campaign.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A-E show a data architecture, data structure, and examples according to various embodiments of the invention.

Figure 1:
FIG. 1 shows a web page having a typical geographic capture area according to one embodiment of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the FIGURE number in which that element is first introduced (e.g., element 105 is first introduced and discussed with respect to FIG. 1).

FIGURE numbers followed by the letters "A," "B," "C," etc., indicate that two or more FIGURES represent alternative or related embodiments or methods under aspects of the invention.

DETAILED DESCRIPTION

The following description provides specific details for a thorough understanding of, and enabling description for, these embodiments of the invention. However, a person of ordinary skill in the art will understand that the invention may be practiced with many variations and these details do not list every possible variation. In some instances, well known structures and functions have not been shown or described in detail to avoid unnecessarily obscuring the description of the embodiments of the invention.

The terms "content" and "objects" may include physical objects, places, or readable information, real estate, products, service providers, news, user contributed content, commercial opportunities, relevant data, and additional geographic information. Characteristics of the content and objects are further described. Examples of characteristics include the size of a home in real estate, the price of a product offered online, the name and contact information of a service provider such as a lawyer, a headline and link to a newspaper article associated with an object or other content, comments or rankings on an object from a user, a commercial opportunity indicating an object is for sale, relevant content such as the tax assessor's records for an object like a house, and geographic information such as the size and type of a park.

Various embodiments of the present invention provide interactive maps that can offer significant value in the context of online search. Interactive maps that allow a user to refine a search with characteristics in addition to a map location have a significant advantage over the use of static non-interactive maps. For example, in an interactive map a user may click on an object that is for sale, view a detailed description, and request the display of relevant comments or other characteristics associated with the object without the server re-drawing the map.

In one embodiment of the invention, a web site implemented in a computer system allows users to select a geographic region. The web site system identifies and ranks real estate service providers associated with the geographic region. A service provider's ranking is based on predetermined criteria such as the service provider's historical activity in the user-selected geographic region. The web site presents the identified real estate service providers to the user, usually by displaying information on the web page but other delivery methods can be used (such as email).

FIG. 1 shows a web page 100 according to one embodiment of the invention. The web page 100 has a viewing window 105 that "flies" over an aerial or satellite image map 110. The user can select various overlays to display on the aerial or satellite image map 110. For example, by clicking on the Show Properties button 115, the user can cause an overlay layer of object and content characteristics to be superimposed on the satellite image map 110. As another example, the user can select "Street Map" to have vector-based representations of streets overlaid on the satellite image map 110.

Figure 2A:
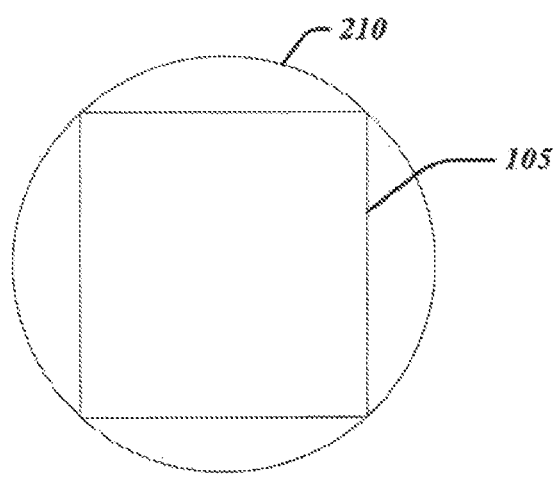
FIGS. 2 A-C show various search region geometries.
Figure 2B:
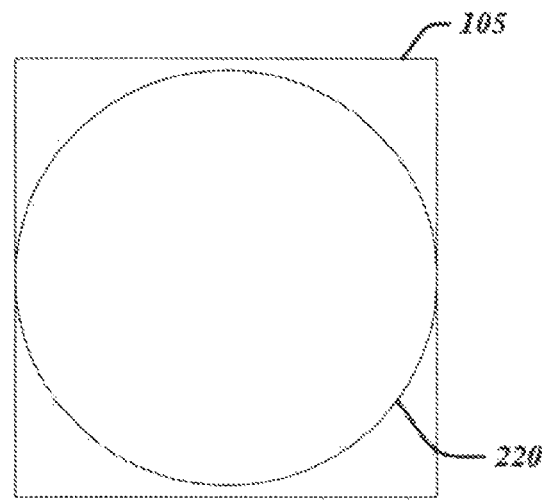
Figure 2C:
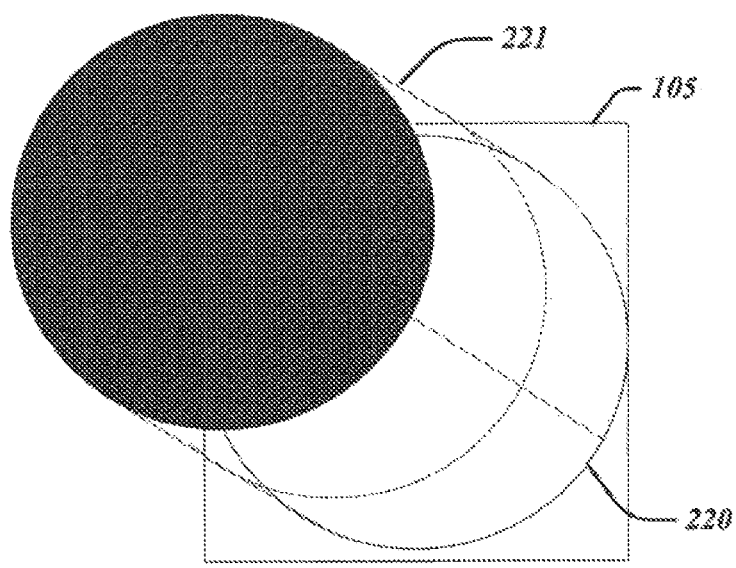

In various embodiments, a latitude, longitude, radius, and/or elevation may be associated with the satellite image map 110 displayed within viewing window 105. This geospatial information can be used by the web site system to define a search region when searching for real estate service providers. Various search region geometries are possible. Some example geometries are shown in FIGS. 2A-B. FIG. 2A shows a circular search region 210 that encompasses the rectangular region displayed in viewing window 105. FIG. 2B shows a circular search region 220 that is encompassed by the rectangular region displayed in viewing window 105. FIG. 2C shows a volume of space represented by multiple X and Y coordinates which define the outline of the circular search region 220 and Z coordinate representing various elevations along the perimeter of the region 221. By including X and Y values 220 with Z values 221, a three dimensional space can be defined above any circular search region 210 or viewing window 105. Another exemplary geometry is a rectangular region that corresponds to the rectangular region displayed in viewing window 105. It should be noted that this combination of X, Y, and Z coordinates can create any arbitrary three dimensional space.

The center of the satellite image map 110 displayed in viewing window 105 has an associated latitude and longitude that, along with a radius, can define a circular search region encompassing the region shown in viewing window 105. Radius information can be determined in several ways. One example is by calculation of the distance from the center point of viewing window 105 to any of its corners. Another way to determine the latitude and longitude of the boundaries of the satellite image 110 displayed in viewing window 105 is by determining the elevation of the plane of the viewing window 105 above the satellite image map 110. The latitudinal and longitudinal bounds of the displayed satellite image 110 can then be calculated using the elevation and the known boundary dimensions of viewing window 105.

In web page 100, sector 120 is reserved for displaying ad information to the user. In the embodiment shown, an advertisement for a real estate agent is displayed in sector 120. In one alternative, sector 120 can display a ranked list of real estate service providers that are active in the displayed satellite image map 110. The web page layout is, of course, not limited to the embodiment shown in FIG. 1. Many variations are possible.

Figure 3A:
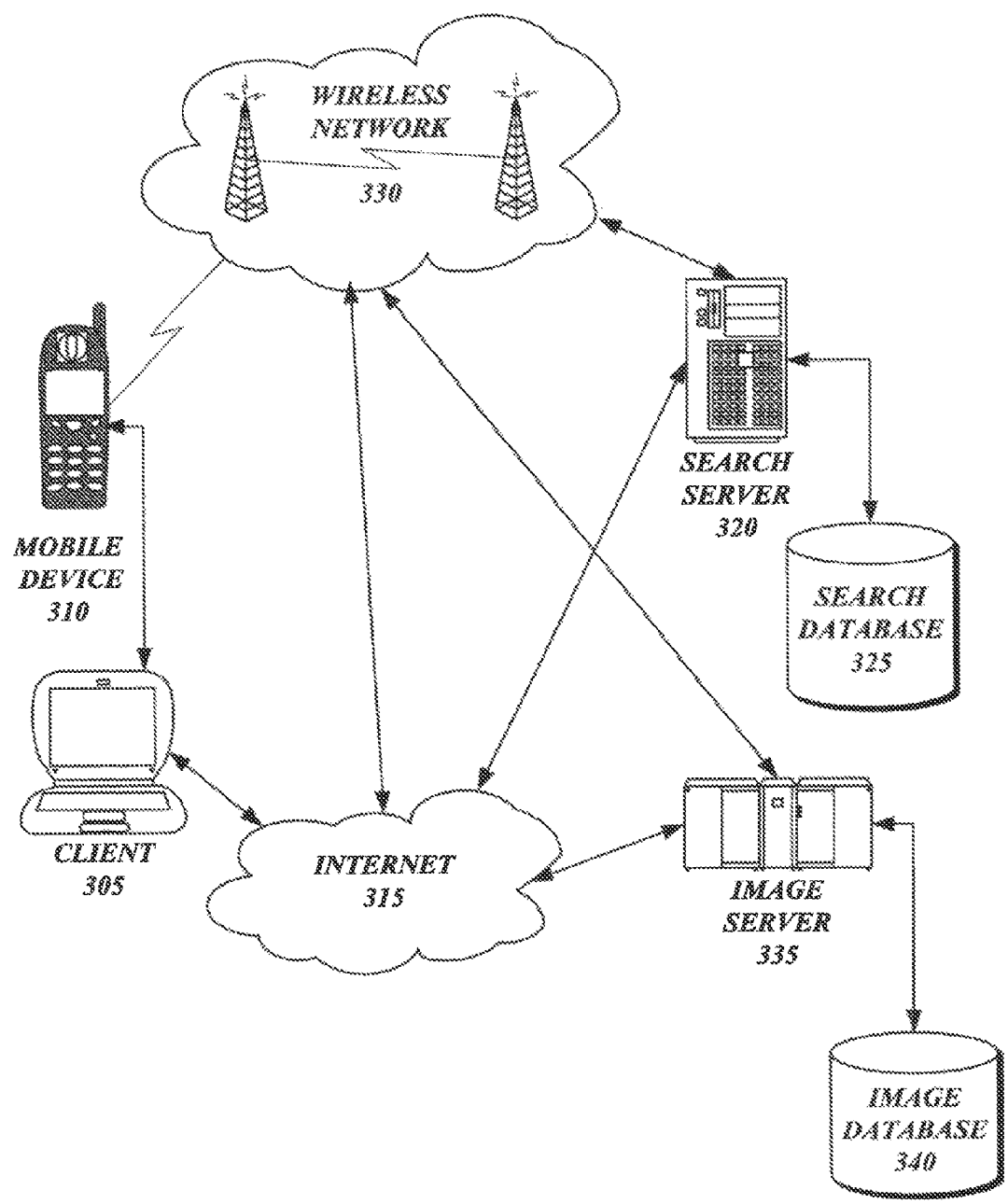
FIGS. 3 A-C shows an environment for one embodiment of the invention.

FIG. 3A shows a block diagram of a network suitable for implementing an embodiment of the invention. A client device 305 communicates over a network, such as the Internet 315, to a search server 320 and an image server 335. Search server 320 can access search database 325 to search objects, content, characteristics, and ad information. Image server 335 can access image database 340 to obtain aerial images such as satellite image tiles. In some embodiments, the aerial image 110 is a single image. In others, aerial image 110 is assembled from image tiles obtained from the image database 340. This assembly can occur in the network, such as at the image server 340, or in the client device 305.

The client device 305 displays and interacts with the web site by way of software applications such as web browsers and other client software that reside in memory of the client device 305. The geospatial calculation algorithms may reside in the client software, the server software, or a combination of the two. The web site typically includes many web pages and generally resides on the search server 320.

A client device 305 with wireless communication capability can communicate wirelessly with a wireless network 330. The client device 305 may communicate directly with the wireless network, such as through a cellular or WLAN modem, or indirectly through an intermediary device such as mobile device 310. Some examples of suitable wireless technologies are wireless local area networks (WLAN) such as IEEE 802.11, Bluetooth, cellular, multi-hop, ultra-wideband (UWB), and broadband wireless (WiMAX) such as IEEE 802.16.

Figure 3B:
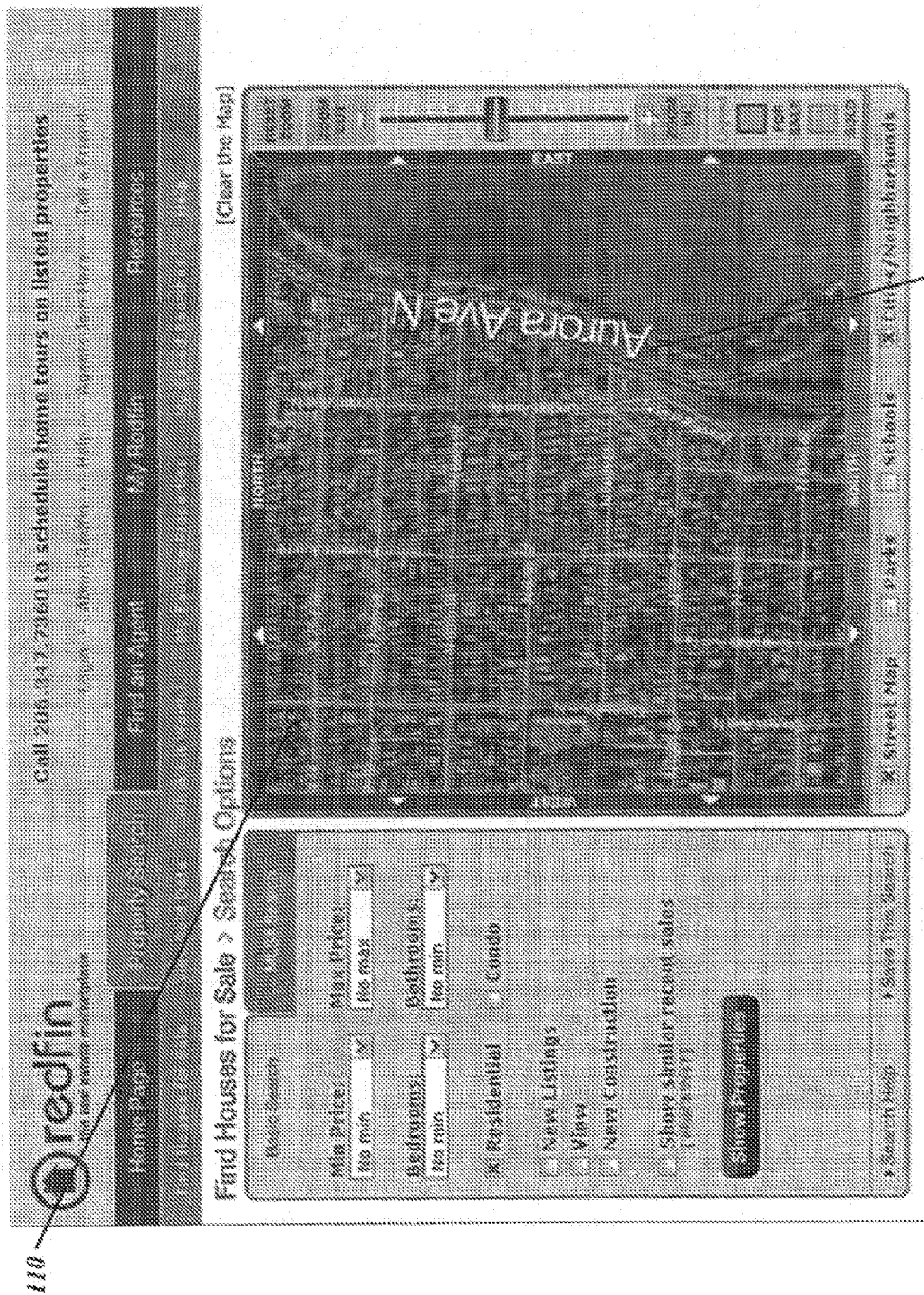
Figure 3C:
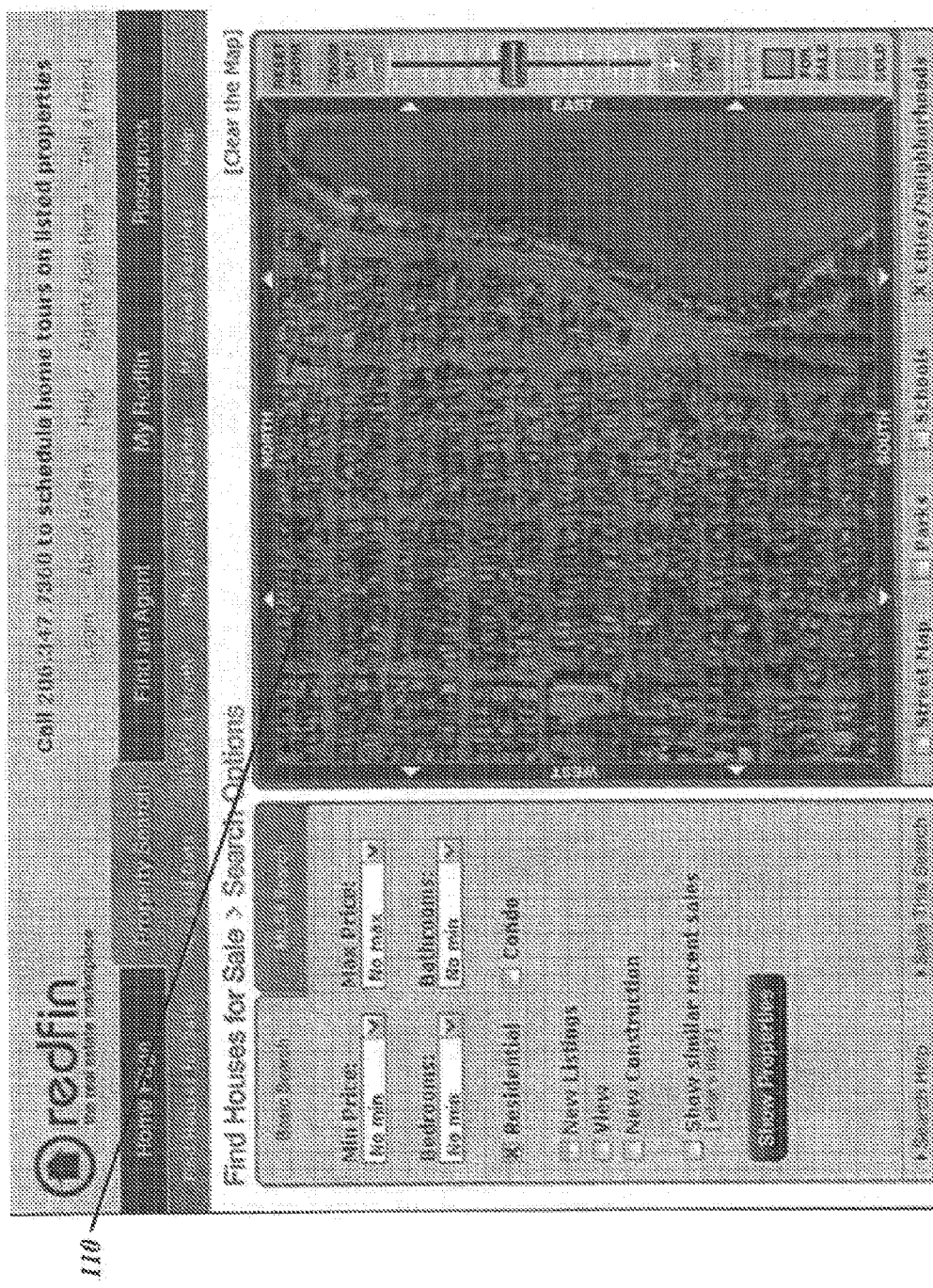

A client device 305 interacts with the search server 305 to receive vector data and image server 335 to receive both vector and raster data. Client software makes one or more requests for data to the servers 320, 335 which are passed to the search and image databases 325, 340. This information is returned to the client device 305 and is assembled to produce a comprehensive map view of the objects and content. Because vector and raster data are requested from separate servers and assembled by software on the client device 305, a smooth user experience is achieved since there is no wait for a centralized server to assemble both raster and vector information in a single request based upon a user action such as a lateral pan, movement in elevation, or selection of an objects or content on the map. FIG. 3B shows an interactive aerial or satellite map 110 with vector data 345 representing roads turned on. FIG. 3C shows an interactive aerial or satellite map 110 with vector information representing roads turned off. The search and image servers 320, 335 do not have to process a new aerial or satellite map when a user turns off the road and labels vector data through instructions through software on the client device 305.

Figure 4:
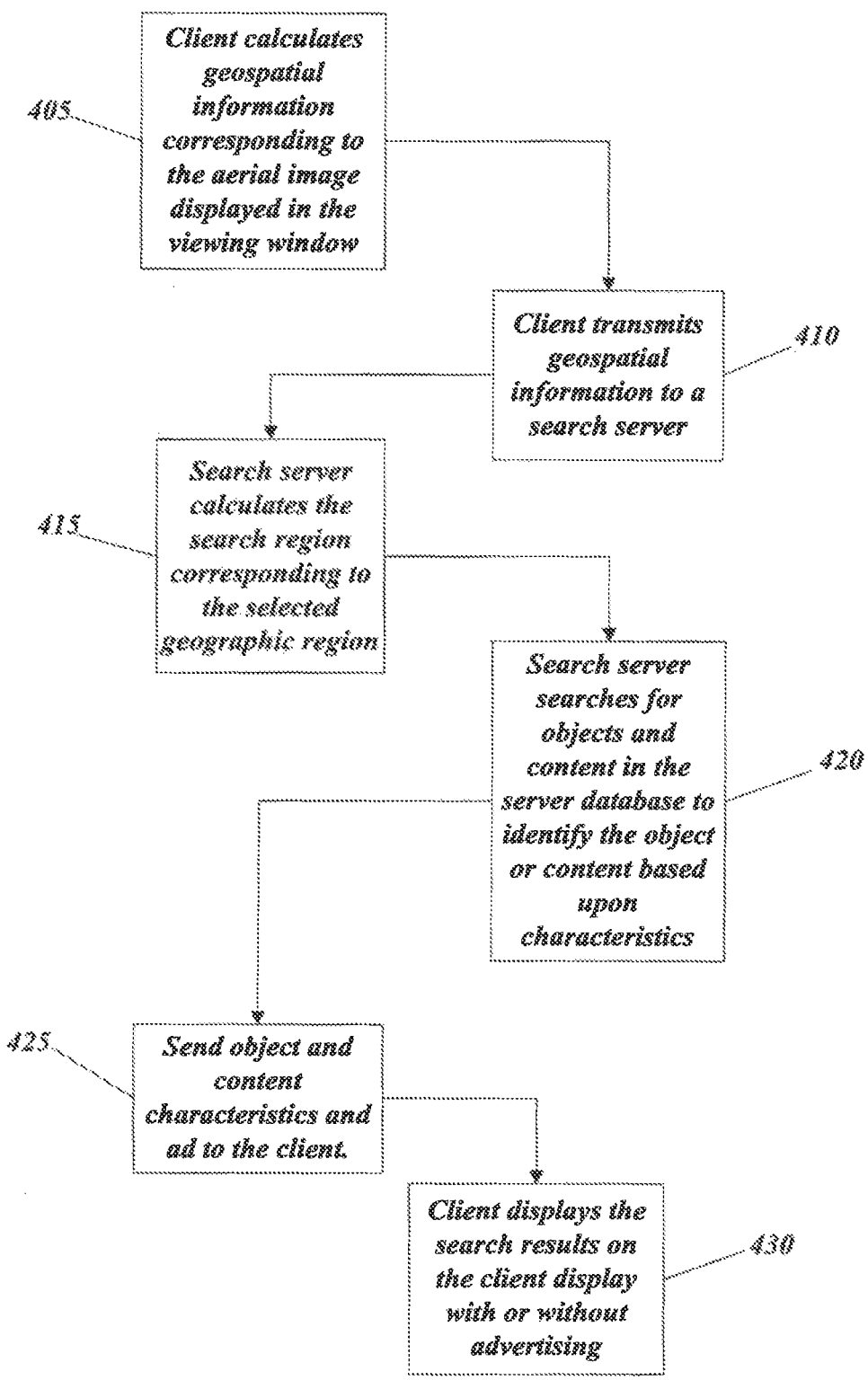
FIG. 4 shows a flow diagram of an embodiment of a method of searching for objects or content via an aerial or satellite image map.

FIG. 4 shows a flow diagram of an embodiment of a method of searching for real estate service provider information via an aerial image map. In 405, the client device 305 calculates geospatial information such as latitude, longitude, and/or elevation corresponding to the aerial or satellite image 110 displayed in the viewing window 105 of the web page 100. As discussed above, the determination of geospatial information can occur in the client device 305 or in a network entity such as search server 320. In 410, the client device transmits the geospatial information over the Internet 315 to search server 320.

In 415, search server 320 determines a search region from the geospatial information. The search region generally corresponds to the geographic region displayed in viewing window 105. In 420, once the search region has been determined, the search server 320 searches the search database 325 for objects and content associated with the search region.

In 425, the search server 320 sends the search results to the client device 305. In 430, the client device 305 displays the objects, content, and characteristics on the client device's display with a relevant ad. Alternatively, the search server 320 could transmit the search results to the user's email account or fax machine. In another embodiment, the search server 320 can transmit results from the search database 325, to the user's mobile device 310. Short Messaging Service (SMS) is one suitable means for transmitting such information to the user's mobile device 310.

Optionally, the search server 320 or client device 305 may rank or categorize the search results based on predetermined criteria. The predetermined criteria can take into account any characteristics associated with an object or content including: names, size, price, type of commercial establishment, parks, schools, key words, or any other type of descriptive information that can be stored in a database including images and multi-media. In addition, ads based upon the object, content, criteria, interaction of the user system can be sent from the search server 320 to the client device 305.

Figure 5:
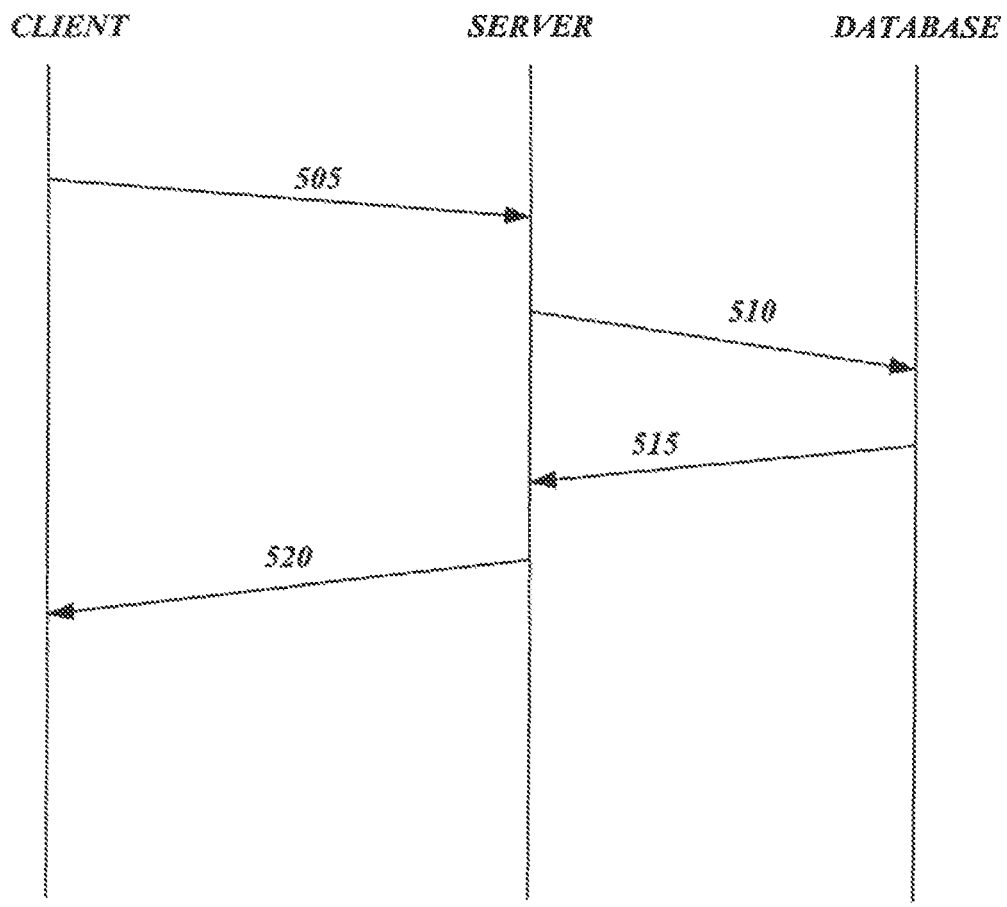
FIG. 5 shows a signal diagram according to the method shown in FIG. 4.

FIG. 5 shows a signal diagram according to the embodiment shown in FIG. 4. At 505, the client device 305 transmits information to the search server 320 or the image server 335. The information can be geospatial coordinates (e.g., latitude, longitude, etc.) or any other suitable information that enables the search server 320 or the image server 335 to determine a search region in which to search for an object or contents. Often the information transmitted in 505 enables the server 320 or image server 335 to determine what region is currently being displayed to the user in the web page's viewing window 105 on the client device's display.

At 510, the search server 320 transmits a search query to the search database 325 or the image server 335 transmits a search query to the image database 340. The search query parameters may specify a search region, the type of object or content, and any other suitable characteristic. At 515, the search results are returned to search server 320 from the search database 325 or to the image server 335 from the image database 340.

At 520, the search server 320 or image server 335 sends the search results to the client device 305. The search results may be ordered, ranked, or prioritized by the search server 320, the image server 335, or by the client device 305 according to predetermined criteria and characteristics. For example, a person who is looking for a house to purchase, may navigate to a relevant geographic region and search for all single-family homes in the geographic area of interest that are between $500,000 and $600,000 with at least 3 bedrooms and 2 bathrooms. The data is depicted visually on the interactive map. As another example, the results of a search could be ranked based on the time that a home has been available on the market, or any other characteristic.

FIGS. 6A shows a data architecture suitable for use with some embodiments of the disclosed invention. Data table 610 has data entries arranged in rows 616, 621, 627 and columns 615, 620, 625. The data in each row is associated with an object or content and, as such, includes additional rows as needed. Column 615 contains object and content identifiers. Any suitable identifier can be used. Column 620 contains geospatial coordinates for the object or content (e.g., latitude and longitude). Column 625 or additional rows of similar data contain one or more characteristics specific to that object or content. Thus, accessing data table 610 at row 616 would give an object or content identifier, geospatial coordinates, and one or more characteristics for the object or content.

Ad identifiers 640, 650, 660 may uniquely identify a message, images, and advertisements from one or more ad purchasers. The ad identifiers point to the objects in data table 610 with which the ad identifiers associated.

Several ads may be associated with the same object or content. For example, ad 1 (identifier 640) may include information specific to object 1 (row 616, col. 615) then identifier 640 would be associated with (i.e., point to) row 616. If ad 2 (identifier 650) included information specific to object 1 (row 616, col. 615), identifier 650 would be associated with row 616. Similarly, any ad 660 could be associated with any Column 615, 620, 625 or Rows 616, 621, or 627.

FIG. 6B shows a data structure suitable for use with the architecture and data table 610 embodiments shown in FIG. 6A. The data structure 675 is a linked list that has a header data field for the advertiser 680, followed by data fields for pointers to rows or columns in data table 610. The pointers from each element of the linked list to the next element have been omitted for ease of explanation. A database entry 675 for advertiser 1 would include pointers 685, 690, 695 to ad identifiers 640, 650, and 660 and actual ad content whether composed of text, images, or a combination which resides on the search server 320 and image server 335. Thus each ad identifier can be searched to verify whether it satisfies the parameters of the search request 510 from search server 320.

An advertiser 680 can identify one or more objects or content 615 associated with a location 620 and specific characteristics 625 found in the columns to associate with ad 1 (identifier 640). If any of this data is exposed during the search and mapping experience of a user, an associated ad 640 or, pointer to a group of ads 685, 690, 695 tied to an advertiser 680, can be shown to the user immediately.

An advertiser 680 can purchase multiple ads based upon geographic qualifiers 620, a bounding box 220, a three dimensional area 221, multiple bounding boxes 220, multiple three dimensional areas 221, characteristics associated with objects and content 625 such as type, price, availability, status, description, text, and other data elements. The pricing for the purchase of individual ads 640, 650, 660 are determined based upon the time that a user is within a defined geographic area or volume, the number ads that will be shown, the expected user interaction with an ad, and the volume of ads that are purchased, or any other means of selling ad inventory that is described in this manner.

Figure 6C:
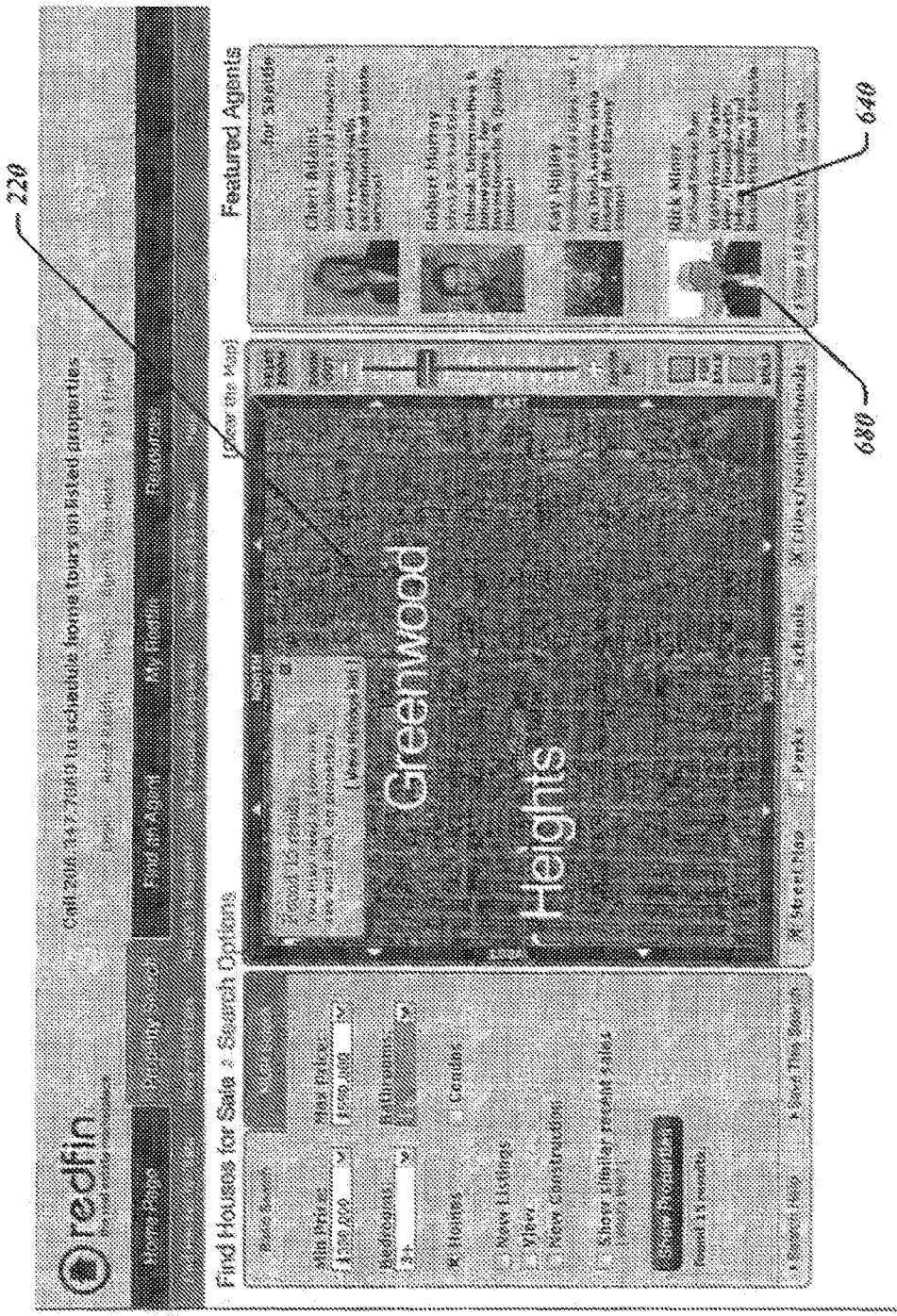
Figure 6D:
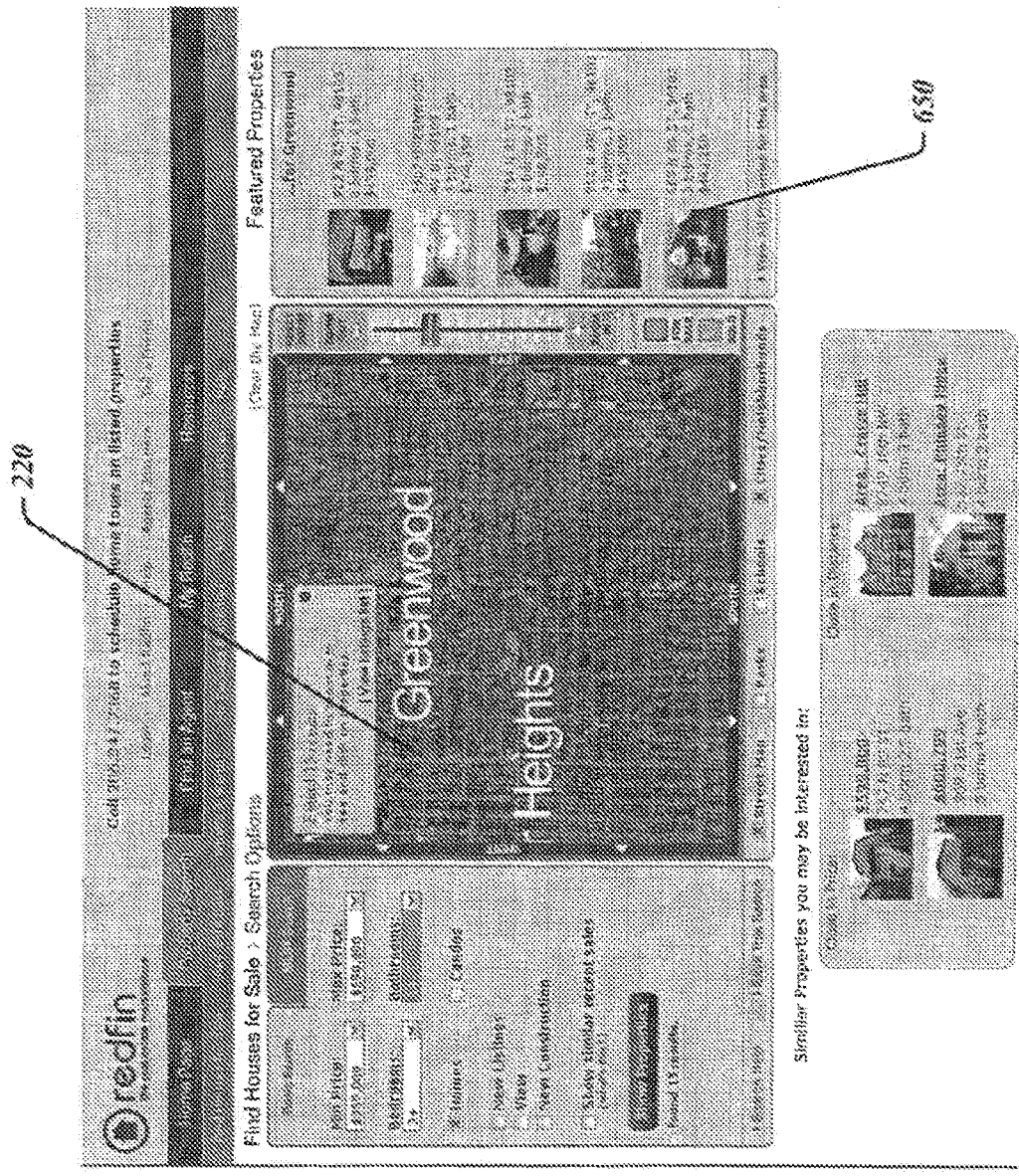
Figure 6E:
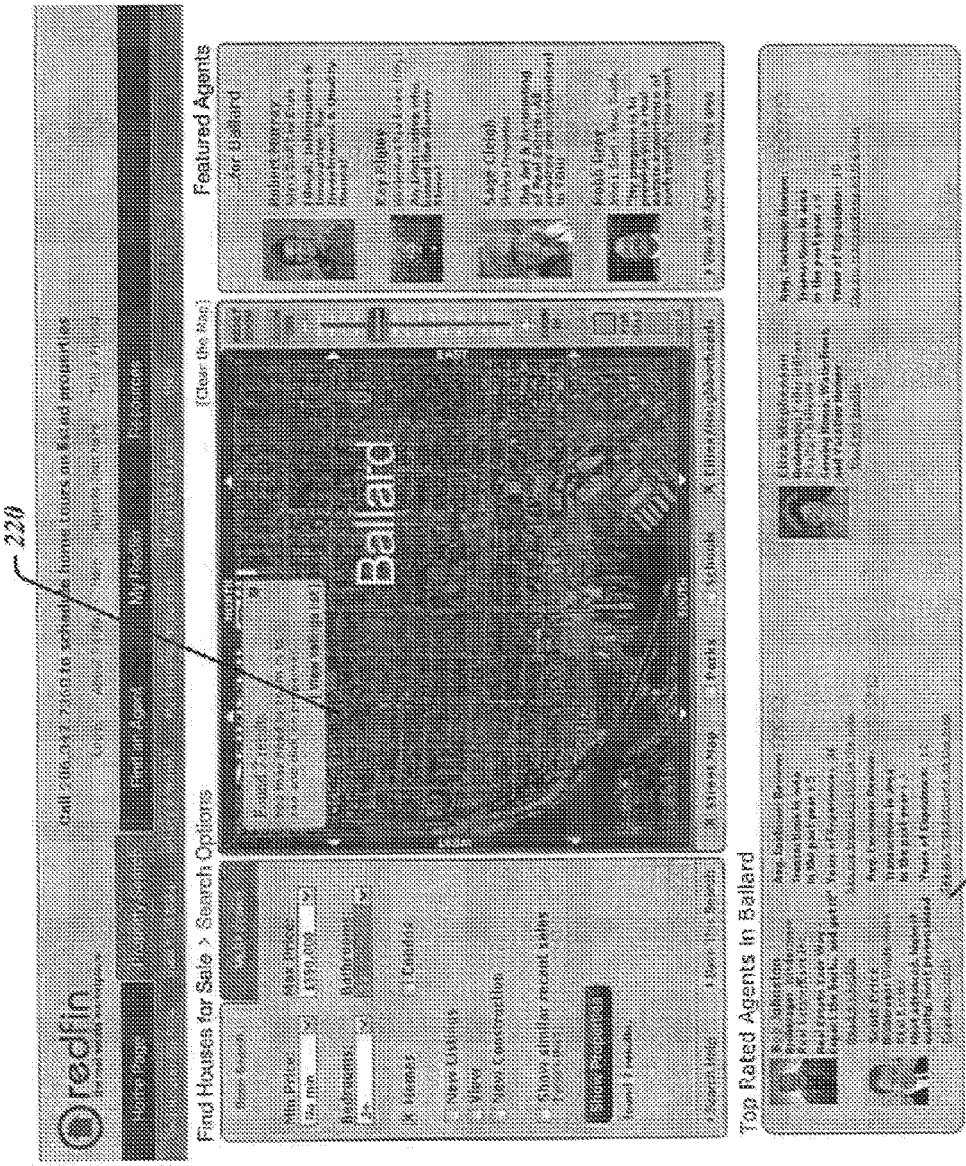

FIG. 6C shows an interactive aerial or satellite map for searching objects and content specific to residential real estate, such as homes currently offered for sale within the current search window 220. In this example, real estate agents are advertisers with ad shown to the right of the map. A specific ad 640, representing a message from a real estate agent 680, is shown based upon the location of the user on the map and other objects and content that have surfaced during the interactive search such as homes and their parcel outlines. Further FIG. 6D shows an additional specific ad for a featured home for sale 650, representing another ad from a real estate agent 680. Additionally, the search server 320 has returned additional objects and content 690 relevant to the user, in this case system recommended homes based upon your current search window 220. Finally, FIG. 6E shows an interactive aerial or satellite map 110 with additional comments and ratings from users 695 tied to individual objects and content, in this case real estate service providers, associated with the current search window 220.

Figure 7:
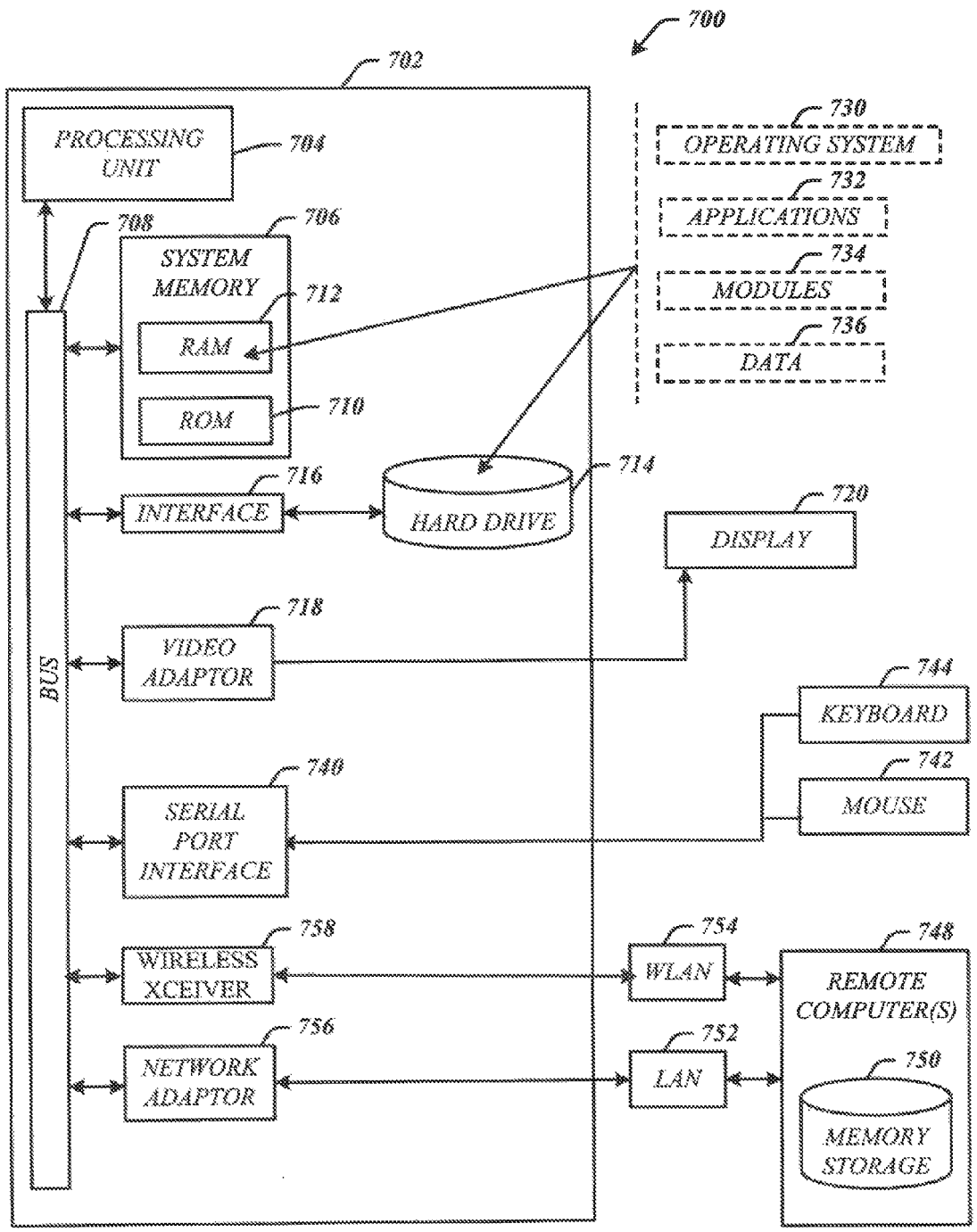
FIG. 7 shows a block diagram of an embodiment of a computer system suitable for use with the disclosed inventions.

FIG. 7 shows a block diagram of a computer 702 in order to provide additional context for various aspects of the present invention. FIG. 7 and the following discussion are intended to provide a brief, general description of a suitable computing environment 700 in which various aspects of the disclosed invention may be implemented. Those skilled in the art will recognize that the invention also may be implemented as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. Aspects of the disclosed inventions may also be practiced in distributed computing environments where certain tasks are performed by remote processing devices that are linked through a communications network. In a distributed computing environment, program modules may be located in both local and remote memory storage devices.

FIG. 7 shows an exemplary environment 700 for implementing various aspects of the disclosed inventions that includes a computer 702, the computer 702 including a processing unit 704, a system memory 706 and a system bus 708. The system bus 708 couples system components including, but not limited to, the system memory 706 to the processing unit 704. The processing unit 704 may be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM. A BIOS contains the basic routines that help to transfer information between elements within the computer 702, such as during start-up.

The computer 702 further includes a hard disk drive 714. The hard disk drive 714 can be connected to the system bus 708 by a hard disk drive interface 716. The removable storage drives (DVD drives, floppy drives, etc.) are not shown for clarity. However, the removable storage drives and their associated computer-readable media provide non-volatile storage of data, data structures, and computer-executable instructions for implementing the inventions described herein. For the computer 702, the drives and media accommodate the storage of information input by a user, or received from a remote computer, in a suitable digital format. Although the description of computer-readable media above refers to a hard disk, a removable magnetic disk, and a DVD, a person of ordinary skill in the art understands that other types of storage media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

Software applications can be stored in the drives and RAM 712. These applications can include an operating system 730, one or more application programs 732, (e.g., web browsers and client applications, etc.) other program modules 734 (e.g., cookies, etc.) and program data 736. All or portions of the operating system, applications, modules, and/or data can also be cached in the RAM 712.

Embodiments of the invention can be implemented with various commercially available operating systems or combinations of operating systems.

A user can enter commands and information into the computer 702 through a keyboard 744 and a pointing device, such as a mouse 742. For example, the user might employ the mouse to navigate the viewing window 105 over the aerial map 110. Other input devices, (not shown) may include a microphone, an IR remote control, a joystick, a game pad, similar devices. These and other input devices are often connected to the processing unit 704 through a serial port interface 740 that is coupled to the system bus 708, but may be connected by other interfaces, such as a parallel port, a game port, a universal serial bus ("USB"), an IR interface, a wireless transceiver 758, etc. A monitor 720 or other type of display device is also connected to the system bus 708 via an interface, such as a video adapter 718. In addition to the display 720, a computer typically includes other peripheral output devices (not shown), such as speakers, printers, etc., that can present information to the user.

As shown in FIG. 3, the computer 702 may operate in a networked environment using logical connections via wired and/or wireless communications to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a local area network (LAN) 752 and a wide area network (WAN) 754. Such networking environments are commonplace in homes and businesses. The Internet can also be used to provide access to remote computer 748.

When used in a LAN networking environment, the computer 702 is connected to the local network 752 through a wired or wireless communication network interface or adapter 756. The adaptor 756 may facilitate wired or wireless communication to the LAN 752. When used in a WAN networking environment, the computer 702 typically is connected to, a communications server on the LAN, or has other means for establishing communications over the WAN 754, such as the Internet. In a networked environment, program modules depicted relative to the computer 702, or portions thereof, may be stored in the remote memory storage device 750. The network connections shown are exemplary and other means of establishing a communications link between the computers may be used.

The computer 702 is operable to communicate with any other devices having wireless communication capability, e.g., a cell phone, a printer, desktop and/or portable computer, portable data assistant, and telephone. As discussed briefly above, suitable wireless technologies may include, but are not limited to, cellular, WLAN (e.g., IEEE 802.11), IEEE 802.16, IEEE 802.20, and Bluetooth™.

IEEE 802.11 is a wireless communication protocol that enables computers to send and receive data anywhere within the range of a base station. A WLAN can be used to connect computers to each other, to the Internet, and to wired networks (which may use IEEE 802.3 or Ethernet communication protocols).

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may also reside in a fixed element of a communication network such as a server or database, while corresponding portions may reside on a mobile communication device, such as a laptop computer, Personal Digital Assistant ("PDA"), or mobile phone. Data structures and transmission of data particular to aspects of the invention are also encompassed within the scope of the invention.

In accordance with the practices of persons skilled in the art of computer programming, embodiments of the invention are described with reference to acts and operations that are performed by computer systems. Such computer-executed acts and operations may be performed by an operating system or an application program. The acts and operations include the manipulation by the CPU of electrical signals representing data bits and the maintenance of data bits at memory locations to operate the computer systems and process signals. The memory locations where data bits are maintained are physical locations that have particular electrical, magnetic, or optical properties corresponding to the data bits.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the embodiments described herein. These and other changes can be made to the invention in light of the detailed description.

Aspects of the invention can be modified, if necessary, to employ the systems, functions and concepts of the various references described above to provide yet further embodiments of the invention.

These and other changes can be made to the invention in light of the above detailed description. In general, the terms used in the following claims should not be construed to be limited to the specific embodiments disclosed in the specification, unless the above detailed description explicitly defines such terms. Accordingly, the actual scope of the invention encompasses the disclosed embodiments and all equivalent ways of practicing or implementing the invention under the claims.

In view of the many possible embodiments to which the principles of this invention may be applied, it should be recognized that the detailed embodiments are illustrative only and should not be taken as limiting the scope of the invention. For example, although the viewing window 105 geometry has been primarily discussed above as a rectangular region, a person of ordinary skill in the art understands that other geometries may be used. For instance, circular viewing windows may be appropriate for some embodiments. As another example, many types of data architectures and data structures are appropriate for various embodiments of the invention. Thus, I claim as my invention all such embodiments as may come within the scope and spirit of the following claims and equivalents thereto.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method comprising the steps of:
   receiving from a user via a network a query for content within a first viewing window of a web page including an interactive electronic map, the query including first geospatial information;
   determining a first three-dimensional search region defined at least in part by the first geospatial information;
   searching a database for a first set of advertisements for commercial entities that provide services within the first three-dimensional search region;
   displaying within the first viewing window of the web page the first three-dimensional search region in the interactive electronic map and within a second viewing window of the web page the first set of advertisements;
   after displaying the first set of advertisements, determining a user interaction with the interactive electronic map, the user interaction defining second geospatial information;
   determining a second three-dimensional search region defined at least in part by the second geospatial information;
   searching the database for a second set of advertisements for commercial entities that provide services within the second three-dimensional search region; and
   in response to determining the user interaction with the interactive electronic map defining the second geospatial information, displaying, without a map image reload and without the user having to wait for the interactive electronic map images to be redrawn, the second three dimensional search region in the interactive electronic map within the first viewing window of the web page and displaying the second set of advertisements within the second viewing window of the web page,
   wherein the preceding steps are performed by at least one processor.

2. The computer-implemented method of claim 1, wherein the query is a query for real estate properties and the advertisements are advertisements of services of real estate agents and other service providers associated with a real estate transaction.

3. The computer-implemented method of claim 1, wherein the displaying the advertisements displays advertisements associated with the content found by searching the database.

4. The computer-implemented method of claim 3, wherein the content is a set of real estate properties and the advertisements are advertisements of services of real estate agents and other service providers associated with a real estate transaction connected with the set of real estate properties.

5. The computer-implemented method of claim 1, wherein the displaying the advertisements is reexecuted periodically to display new advertisements after a period of time.

6. The computer-implemented method of claim 1, wherein the displaying the advertisements connected with the search region is defined by the second viewing window, geospatial information, and demographic information.

7. The computer-implemented method of claim 1, wherein the displaying the advertisements comprises delivering advertisements of one or more real estate agents or other providers associated with a real estate transaction when conducting an online real estate search query.

8. The computer-implemented method of claim 1, wherein the displaying the advertisements is executed by one or more Web services for delivering the advertisements.

9. The computer-implemented method of claim 1, wherein the displaying the advertisements comprises delivering advertisements to a customer.

10. The computer-implemented method of claim 1, wherein the displaying the advertisements composes returning the content to the advertiser or the customer using extensible markup language (XML).

11. The computer-implemented method of claim 1, wherein the query is a query for properties.

12. The computer-implemented method of claim 1, wherein the user interaction with the interactive electronic map comprises a zoom command.

* * * * *